United States Patent
Fekri et al.

(10) Patent No.: US 10,511,695 B2
(45) Date of Patent: Dec. 17, 2019

(54) PACKET-LEVEL CLUSTERING FOR MEMORY-ASSISTED COMPRESSION OF NETWORK TRAFFIC

(71) Applicant: Georgia Tech Research Corporation, Atlanta, GA (US)

(72) Inventors: Faramarz Fekri, Atlanta, GA (US);
Mohsen Sardari, Atlanta, GA (US);
Ahmad Beirami, Atlanta, GA (US);
Liling Huang, Atlanta, GA (US);
Afshin Abdi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 35 days.

(21) Appl. No.: 15/191,280

(22) Filed: Jun. 23, 2016

(65) Prior Publication Data
US 2016/0381188 A1    Dec. 29, 2016

Related U.S. Application Data

(60) Provisional application No. 62/183,725, filed on Jun. 23, 2015.

(51) Int. Cl.
*H04L 29/06*    (2006.01)
(52) U.S. Cl.
CPC ................... *H04L 69/04* (2013.01)
(58) Field of Classification Search
CPC ....... H04L 67/04; H04L 47/365; H04L 47/38; H03M 7/30
See application file for complete search history.

(56) References Cited

U.S. PATENT DOCUMENTS

| 6,100,825 | A | * | 8/2000 | Sedluk | H03M 7/3088 341/51 |
| 7,430,617 | B2 | * | 9/2008 | Walsh | H04L 12/1868 370/392 |
| 7,499,857 | B2 | * | 3/2009 | Gunawardana | G10L 15/07 704/244 |

(Continued)

OTHER PUBLICATIONS

Mahoney, Matt, "Data Compression Programs", http:mattmahoney.net/dc/, obtained from Archive.org, snapshot taken Dec. 31, 2013, accessed Dec. 19, 2017.*

(Continued)

*Primary Examiner* — Khaled M Kassim
*Assistant Examiner* — Thomas R Cairns
(74) *Attorney, Agent, or Firm* — Troutman Sanders LLP; Ryan A. Schneider; Brennan M. Carmody

(57) ABSTRACT

Certain implementations of the disclosed technology may include methods and computing systems for memory-assisted compression of network packets using packet-level clustering. According to an example implementation, a method is provided. The method may include vectorizing a plurality of data packets stored in a memory, calculating respective distances between each of the respective vectorized data packets, clustering the plurality of data packets into a plurality of data packet clusters, obtaining a sample data packet to be compressed, identifying a training data packet cluster from among the plurality of data packet clusters, and compressing the sample data packet using a compression algorithm.

19 Claims, 6 Drawing Sheets

(56) References Cited

U.S. PATENT DOCUMENTS

| | | | | |
|---|---|---|---|---|
| 7,975,071 | B2* | 7/2011 | Ramjee | H04L 67/2876 |
| | | | | 370/352 |
| 8,046,496 | B1* | 10/2011 | Nucci | H04J 3/18 |
| | | | | 370/477 |
| 2015/0161518 | A1* | 6/2015 | McCann | G06N 7/005 |
| | | | | 706/12 |
| 2016/0119449 | A1* | 4/2016 | Zhang | H04L 69/04 |
| | | | | 709/247 |
| 2016/0277368 | A1* | 9/2016 | Narayanaswamy | |
| | | | | G06F 21/6218 |
| 2018/0041782 | A1* | 2/2018 | Kwon | H04N 21/235 |

OTHER PUBLICATIONS

Anand, A., et al., "Packet Caches on Routers: The Implications of Universal Redundant Traffic Elimination", SIGCOMM, vol. 38, pp. 219-230, 2008.

Anand, A., et al., "SmartRE: An Architecture for Coordinated Network-Wide Redundancy Elimination", SIGCOMM, vol. 39, No. 4, pp. 87-98, 2009.

Baron, D. et al., "An O(N) Semipredictive Universal Encoder Via the BWT", IEEE Transactions on Information Theory, vol. 50, No. 5, pp. 928-937, May 2004.

Barron, A. et al., "The Minimum Description Length Principle in Coding and Modeling", IEEE Transactions on Information Theory, vol. 44, No. 6, pp. 2743-2760, Oct. 1998.

Beirami, A. et al., "Memory-Assisted Universal Source Coding", Data Compression Conference (DCC), 2012, pp. 392-392, 2012.

Beirami, A. et al., "On Optimality of Data Clustering for Packet-Level Memory-Assisted Compression of Network Traffic", in 15th IEEE International Workshop on Signal Processing Advances in Wireless Communications (SPAWC 2014), Toronto, Canada, Jun. 2014.

Beirami, A., et al., "Results on the Fundamental Gain of Memory-Assisted Universal Source Coding", in 2012 IEEE International Symposium on Information Theory (ISIT), Jul. 2012, pp. 1092-1096.

Beirami, A. et al., "Results on the Optimal Memory-Assisted Universal Compression Performance for Mixture Sources", 51st Annual Allerton Conference, Oct. 2-3, 2013, pp. 890-895.

Beirami, A. et al., "Results on the Redundancy of Universal Compression for Finite-Length Sequences", in IEEE International Symposium on Information Theory (ISIT), Jul. 31-Aug. 5, 2011, pp. 1504-1508.

Bilmes, J., "A Gentle Tutorial of the EM Algorithm and its Application to Parameter Estimation for Gaussian Mixture and Hidden Markov Models", International Computer Science Institute, Tech. Rep. TR-97-021, Apr. 1998.

Clarke, B. et al, "Information-Theoretic Asymptotics of Bayes Methods", IEEE Transactions on Information Theory, vol. 36, No. 3, pp. 453-471, May 1990.

Clarke, B. et al., "Jeffreys Prior is Asymptotically Least Favorable Under Entropy Risk", Journal of Statistical Planning and Inference, vol. 41, pp. 37-60, 1994.

Csiszar, I. et al., "Context Tree Estimation for Not Necessarily Finite Memory Processes, Via BIC and MDL", IEEE Transactions on Information Theory, vol. 52, No. 3, pp. 1007-1016, Mar. 2006.

Csiszar, I. et al., "The Consistency of the Bic Markov Order Estimator", Information Theory, 2000.

Davisson, L., "Universal Noiseless Coding", IEEE Transactions on Information Theory, vol. 19, No. 6, pp. 783-795, Nov. 1973.

Dempster, P. et al., "Maximum Likelihood from Incomplete Data Via the EM Algorithm", Journal of the Royal Statistical Society, Series B (Methodological), vol. 39, No. 1, pp. 1-38, 1977.

Deutsch, L. P., "GZIP File Format Specification Version 4.3", Aladdin Enterprises, pp. 1-12, May 1966.

Effros, M. et al., "Universal Lossless Source Coding with the Burrows Wheeler Transform", IEEE Transactions on Information Theory, vol. 48, No. 5, pp. 1061-1081, May 2002.

Finesso, L. et al., "The Optimal Error Exponent for Markov Order Estimation", IEEE Transactions on Information Theory, vol. 42, No. 5, pp. 1488-1497, Sep. 1996.

Garivier, A., "Consistency of the Unlimited BIC Context Tree Estimator", IEEE Transactions on Information Theory, vol. 52, No. 10, pp. 4630-4635, Oct. 2006.

Halepovic, E. et al., "Enhancing Redundant Network Traffic Elimination", Elsevier B.V., Computer Networks, vol. 56, pp. 795-809, 2012.

Hansen, M.H. et al., "Model Selection and the Principle of Minimum Description Length", Journal of the American Statistical Association, vol. 96, No. 454, pp. 746-774, Jun. 2001.

Hsiang-Shen, S. et al., "REfactoring Content Overhearing to Improve Wireless Performance", MobiCom, Las Vegas, NV, 2011.

Krichevsky, R. et al., "The Performance of Universal Encoding", IEEE Transactions on Information Theory, vol. 27, No. 2, pp. 199-207, 1981.

Krishnan, N. et al., "A Parallel Two-Pass MDL Context Tree Algorithm for Universal Source Coding", 2014 IEEE International Symposium on Information Theory Proceedings (ISIT '14), Jul. 2014.

Mahoney, M., "Adaptive Weighing of Context Models for Lossless Data Compression", Florida Institute of Technology CS Department, Technical Report CS-2005-16, 2005.

Merhav, N. et al., "A Strong Version of the Redundancy-Capacity Theorem of Universal Coding", IEEE Transactions on Information Theory, vol. 41, No. 3, pp. 714-722, May 1995.

Omohundro, S.M., "Five Balltree Construction Algorithms", International Computer Science Institute, Berkeley, CA, Nov. 1989.

Rached, Z. et al., "The Kullback-Leibler Divergence Rate Between Markov Sources", IEEE Transactions on Information Theory, vol. 50, No. 5, pp. 917-921, May 2004.

Rissanen, J., "A Universal Data Compression System", IEEE Transactions on Information Theory, vol. 29, No. 5, pp. 656-664, Sep. 1983.

Rissanen, J., "Universal Coding, Information, Prediction, and Estimation", IEEE Transactions on Information Theory, vol. 30., No. 4, pp. 629-636, Jul. 1984.

Sanadhya, S. et al., "Asymmetric Caching: Improved Deduplication for Mobile Devices", in Proceedings of the ACM MOBICOM 2012 Conference, ACM, Istanbul, Turkey, 2012.

Sardari, M. et al., "Content-Aware Network Data Compression Using Joint Memorization and Clustering", IEEE INFOCOM, Turin, Italy, Apr. 2013.

Sardari, M. et al., "Memory-Assisted Universal Compression of Network Flows", IEEE INFOCOM, Orlando, FL, Mar. 2012, pp. 91-99.

Sardari, M. et al., "On the Network-Wide Gain of Memory-Assisted Source Coding", 2011 IEEE Information Theory Workshop (ITW), Oct. 2011, pp. 476-480.

Talata, Z. et al., "BIC Context Tree Estimation for Stationary Ergodic Processes", IEEE Transactions on Information Theory, vol. 57, No. 6, pp. 3877-3886, Jun. 2011.

Weinberger, M. et al., "A Sequential Algorithm for the Universal Coding of Finite Memory Sources", IEEE Transactions on Information Theory, vol. 38, No. 3, pp. 1002-1014, 1992.

Willems, F. et al., "The Context-Tree Weighting Method: Basic Properties", IEEE Transactions on Information Theory, vol. 41, No. 3, pp. 653-664, May 1995.

Willems, F. et al., "The Context-Tree Weighting Method: Extensions", IEEE Transactions on Information Theory, vol. 44, No. 2, pp. 792-798, Mar. 1998.

Zhuang, Z. et al., "Curing the Amnesia: Network Memory for the Internet", Georgia Institute of Technology, Technical Report, 2009.

Ziv, J. et al., "A Universal Algorithm for Sequential Data Compression", IEEE Transactions on Information Theory, vol. 23, No. 3 pp. 337-343, May 1977.

Ziv, J. et al., "A Universal Prediction Lemma and Applications to Universal Data Compression and Prediction", IEEE Transactions on Information Theory, vol. 47, No. 4, pp. 1528-1532, May 2001.

Ziv, J. et al., "Compression of Individual Sequences Via Variable-Rate Coding", IEEE Transactions on Information Theory, vol. 24, No. 5, pp. 530-536, Sep. 1978.

(56) References Cited

OTHER PUBLICATIONS

Ziv, J., "On Classification with Empirically Observed Statistics and Universal Data Compression", IEEE Transactions on Information Theory, vol. 34, No. 2, pp. 278-286, Mar. 1988.
Zohar, E. et al., "The Power of Prediction: Cloud Bandwidth and Cost Reduction", SIGCOMM 2011 Conference, ACM, Toronto, Ontario, Canada, pp. 86-97, Aug. 2011.
Wireshark Packet Analyser, http://www.wireshark.org.
Bishop, C., Pattern Recognition and Machine Learning, 2006, Springer.

* cited by examiner

PACKET-LEVEL CLUSTERING FOR MEMORY-ASSISTED COMPRESSION OF NETWORK TRAFFIC

CROSS REFERENCE TO RELATED APPLICATIONS

This application claims priority to U.S. Provisional Patent Application Ser. No. 62/183,725, filed on Jun. 23, 2015, which is incorporated herein by reference in its entirety.

STATEMENT REGARDING FEDERALLY SPONSORED RESEARCH OR DEVELOPMENT

This invention was made with government support under grant CNS1017234, awarded by the National Science Foundation. The federal government has certain rights in the invention.

FIELD

This disclosure relates generally to the field of data compression and, more specifically, to a memory-assisted data compression system with clustering.

BACKGROUND

The large amount of data produced and transmitted daily around the world has resulted in a considerable amount of redundancy in the traffic. Recent studies confirm that most of this redundancy is present at the packet level. In other words, packets generated by the same or different sources, and destined to the same or different clients, contain significant cross-packet correlation. However, for an IP packet with a length only approximately 1500 bytes, conventional compression techniques have proven inefficient in capturing the redundancy in data, as compression performance primarily depends on sequence length. Stated differently, there is a significant penalty with respect to what is fundamentally achievable when attempting to universally compress a finite-length packet. On the other hand, many data packets share common context, which, ideally, could be exploited for improved compression.

For example, it would be desirable to have a computing system capable of encoding and compressing discrete individual delivering packets more efficiently by utilizing the dependency across multiple packets and side-information provided from the memory. Accordingly, a protocol-independent and content-aware network packet compression scheme for removing data redundancy is desired.

Conventional data compression systems have sought to eliminate the redundancy in network data packets by equipping some nodes in the network with memorization capability in order to perform better packet-level redundancy elimination via deduplication. However, these conventional data compression systems may be considered sub-optimal in that they fail to account for either statistical redundancies within a data packet or significant dependencies existing across packets. Thus, it would be desirable to have a data compression system capable of suppressing these statistical redundancies, e.g., via suitable statistical compression techniques.

SUMMARY

The disclosed technology provides computing systems and methods for memory-assisted compression of network packets using packet-level clustering. Although this disclosure focuses on data compression techniques for use in compressing network packets, those having ordinary skill in the art will recognize that the systems and techniques described herein are not so limited and may be suitably applied across a wide array of technologies where data compression is desired.

In one example, a computer-implemented method of compressing a sample data packet is provided. The method may include vectorizing a plurality of data packets stored in a memory to provide vectorized data packets. Respective distances between each of the vectorized data packets may be calculated. Further, the method may include clustering (i.e., grouping) the plurality of data packets into a plurality of data packet clusters based on the calculated respective distances between each of the vectorized data packets. The method may also include obtaining (e.g., fetching or receiving) the sample data packet to be compressed. A training data packet cluster may be identified from among the plurality of data packet clusters based on the sample data packet (e.g., based on a determination that the sample data packet and the data packets in the training data packet cluster likely originated from a same source model). Finally, the method may include compressing the sample data packet using a compression algorithm to provide a compressed sample data packet. The compressing may be based, at least in part, on the identified training data packet cluster.

In another example, the method may additionally include packaging, as part of a data packet for transmission over a network, the compressed sample data packet along with indices representative of the data packets included as part of the training data packet cluster.

In another example, the step of identifying the training data packet cluster may include vectorizing the sample data packet, vectorizing the plurality of data packet clusters, and calculating respective distances between the vectorized sample data packet and each of the vectorized data packet clusters. In one example, the step of calculating the respective distances between the vectorized sample data packet and each of the vectorized data packet clusters may be accomplished using a non-parametric clustering algorithm, such as the non-parametric clustering algorithm disclosed herein.

In yet another example, the compression algorithm used to compress the sample data packet can include a Lite PAQ compression algorithm and/or a context tree weighting (CTW) compression algorithm.

In another example, the respective distances between each of the vectorized data packets may be calculated using a Hellinger distance calculation or a Euclidean distance calculation.

In yet another example, the method may include the additional step of decompressing the compressed sample data packet. In this example, the decompressing may be based at least in part on the identified training data packet cluster.

Corresponding computing systems and non-transitory computer-readable media for performing the foregoing techniques are also disclosed.

BRIEF DESCRIPTION OF THE FIGURES

Reference will now be made to the accompanying Figures, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein.

Example implementations of the disclosed technology provide methods and computing systems for performing memory-assisted compression with clustering.

Example implementations of the disclosed technology will now be described with reference to the accompanying figures.

Figure 1:
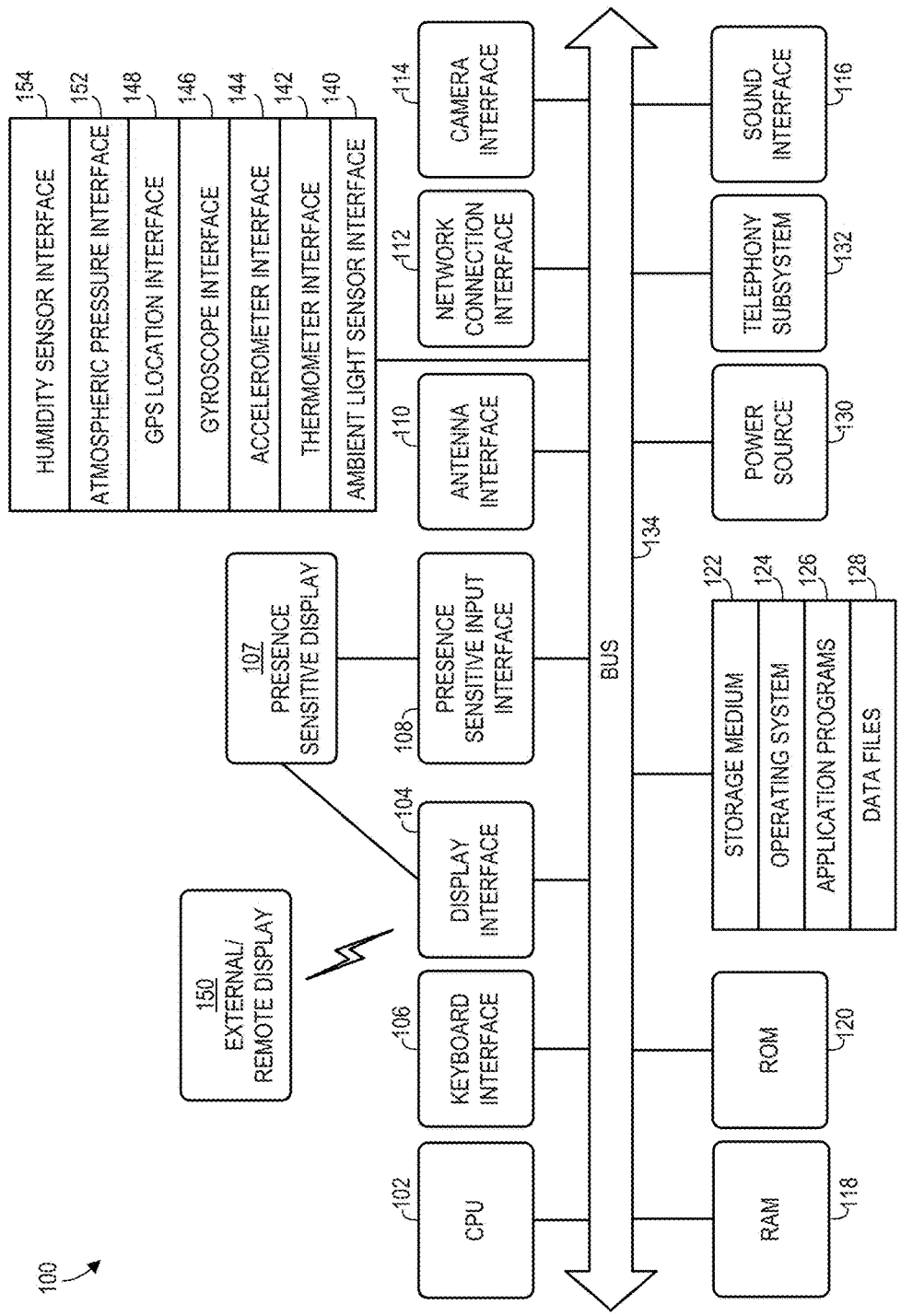
FIG. 1 illustrates computing system architecture 100, according to an example implementation of the disclosed technology.

As desired, implementations of the disclosed technology may include a computing device with more or less of the components illustrated in FIG. 1. The computing device architecture 100 is provided for example purposes only and does not limit the scope of the various implementations of the present disclosed computing systems, methods, and computer-readable mediums.

The computing device architecture 100 of FIG. 1 includes a central processing unit (CPU) 102, where executable computer instructions are processed; a display interface 104 that supports a graphical user interface and provides functions for rendering video, graphics, images, and texts on the display. In certain example implementations of the disclosed technology, the display interface 104 connects directly to a local display, such as a touch-screen display associated with a mobile computing device. In another example implementation, the display interface 104 provides data, images, and other information for an external/remote display 150 that is not necessarily physically connected to the mobile computing device. For example, a desktop monitor can mirror graphics and other information presented on a mobile computing device. In certain example implementations, the display interface 104 wirelessly communicates, for example, via a Wi-Fi channel or other available network connection interface 112 to the external/remote display.

In an example implementation, the network connection interface 112 can be configured as a wired or wireless communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 can include a keyboard interface 106 that provides a communication interface to a physical or virtual keyboard. In one example implementation, the computing device architecture 100 includes a presence-sensitive display interface 108 for connecting to a presence-sensitive display 107. According to certain example implementations of the disclosed technology, the presence-sensitive input interface 108 provides a communication interface to various devices such as a pointing device, a capacitive touch screen, a resistive touch screen, a touchpad, a depth camera, etc. which may or may not be integrated with a display.

The computing device architecture 100 can be configured to use one or more input components via one or more of input/output interfaces (for example, the keyboard interface 106, the display interface 104, the presence sensitive input interface 108, network connection interface 112, camera interface 114, sound interface 116, etc.,) to allow the computing device architecture 100 to present information to a user and capture information from a device's environment including instructions from the device's user. The input components can include a mouse, a trackball, a directional pad, a track pad, a touch-verified track pad, a presence-sensitive track pad, a presence-sensitive display, a scroll wheel, a digital camera including an adjustable lens, a digital video camera, a web camera, a microphone, a sensor, a smartcard, and the like. Additionally, an input component can be integrated with the computing device architecture 100 or can be a separate device. As additional examples, input components can include an accelerometer, a magnetometer, a digital camera, a microphone, and an optical sensor.

Example implementations of the computing device architecture 100 can include an antenna interface 110 that provides a communication interface to an antenna; a network connection interface 112 can support a wireless communication interface to a network. As mentioned above, the display interface 104 can be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where executable computer instructions and data can be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files include an operating system 124, application programs 126 (including, for example, a web browser application, a widget or gadget engine, and or other applications, as necessary), and data files 128. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive audio and data information over a telephone network. Although shown as a separate subsystem, the telephony subsystem 132 may be implemented as part of the network connection interface 112. The constituent components and the CPU 102 communicate with each other over a bus 134.

According to an example implementation, the CPU 102 has appropriate structure to be a computer processor. In one arrangement, the CPU 102 includes more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 in order to execute software programs. Data can be stored in the RAM 118, where the data can be accessed by the computer CPU 102 during execution. In one example configuration, the device architecture 100 includes at least 128 MB of RAM, and 256 MB of flash memory.

The storage medium 122 itself can include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system, can be tangibly embodied in storage medium 122, which can include a machine-readable storage medium.

According to one example implementation, the term computing device, as used herein, can be a CPU, or conceptualized as a CPU (for example, the CPU 102 of FIG. 1). In this example implementation, the computing device (CPU) can be coupled, connected, and/or in communication with one or more peripheral devices, such as display. In another example implementation, the term computing device, as used herein, can refer to a mobile computing device such as a smartphone, tablet computer, or smart watch. In this example implementation, the computing device outputs content to its local display and/or speaker(s). In another example implementation, the computing device outputs content to an external display device (e.g., over Wi-Fi) such as a TV or an external computing system.

In example implementations of the disclosed technology, a computing device includes any number of hardware and/or software applications that are executable to facilitate any of the operations. In example implementations, one or more I/O interfaces facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., can facilitate user interaction with the computing device. The one or more I/O interfaces can be utilized to receive or collect data and/or user instructions from a wide variety of input devices. Received data can be processed by one or more computer processors as desired in various implementations of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

I. Related Work

The technology disclosed herein is based on some foundation underpinnings worth discussing before proceeding into a more detailed explanation of the present technology. For example, aspects of the disclosed technology utilize a framework for compression of small sequences referred to as memory-assisted compression. In a memory-assisted framework, compression of a sequence is performed using a memory of the previously seen sequences. Consequently, every sequence can be compressed far better compared to the case that the sequence is compressed on its own without considering the memory. It has been demonstrated that memory-assisted compression has significant potential for removal of the redundancy from network packets. A more detailed overview of memory-assisted compression follows.

Let a parametric source be defined using a d-dimensional parameter vector $\mu\theta=(\mu_1, \ldots, \mu_d) \in \Delta$ that is a priori unknown, where d denotes the number of the source parameters and $\theta=(\theta^{(1)}, \ldots, \theta^{(K)})$ is the K-source mixture source randomly generated from the source parameter vector space $\Delta$.

Let $X^n=\{x_1, x_2, \ldots, x_n\}$ denote sample packet with length n from the mixture source model $\theta$. Denote $Y^{n,T}=\{y^n(t)\}_{t=1}^T$ as the set of the previous T sequences shared between compressor and decompressor, where $y^n(t)$ is a sequence of length n generated from the source $\theta^{P(t)}$. In other words, $y^n(t) \sim \theta^{P(t)}$. Further, denote P as the vector $P=((P(1), \ldots, P(T))$, which contains the indices of the sources that generated the T previous side information sequences.

Figure 2:
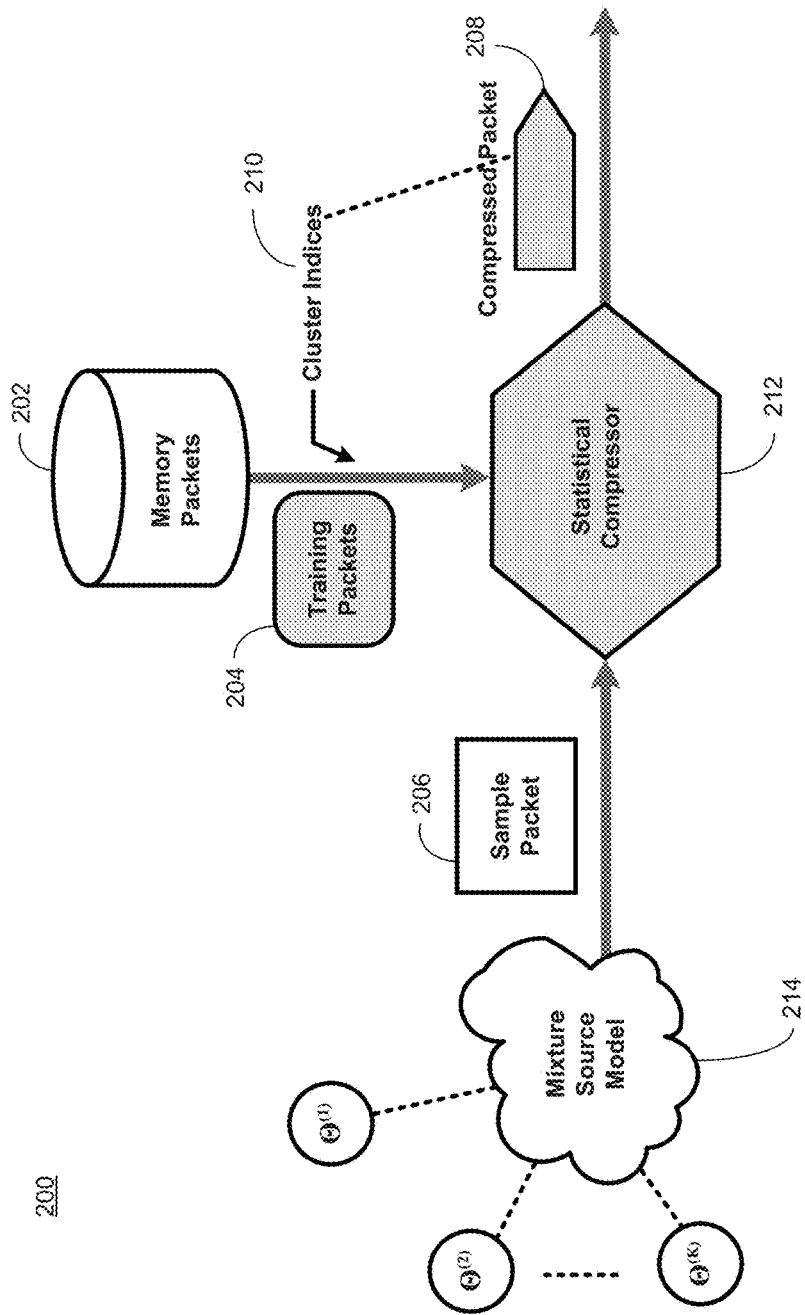
FIG. 2 illustrates a data source architecture of the memory-assisted compression system with clustering in accordance with an exemplary embodiment of the disclosed technology.

Consider a scenario focused on the class of strictly lossless uniquely decodable fixed-to-variable codes such as strictly lossless coding, via statistical compression and dictionary-based compression. Most of the universal compression schemes are strictly lossless codes, namely, Lempel-Ziv, CTW algorithm and Lite PAQ algorithm. In FIG. 2 (discussed in detail below), it is assumed that both the compressor and the decompressor have access to a common side information of previous packet sequences $y^{n,T}$ from the mixture of K parametric sources, where each packet is independently generated according to the above procedure. To achieve the best compression performance of sample packet $x^n$, the following four data preprocessing schemes are considered:

(1) Ucomp: Universal compression, which is the conventional compression based solution without utilizing memory.

(2) UcompSM: Universal compression with simple memory (common memory between the compressor and the decompressor), which treats the side information as if it were generated from a single parametric source.

(3) UcompPCM: Universal compression with perfectly clustered memory (based on the source indices), which assumes that the source indices of the side information sequences are labeled, and hence, only the relevant side information is used toward the compression of a new packet.

(4) UcompCM: Universal compression with clustered memory. This utilizes the non-parametric clustering-based scheme to select useful memory and is described in detail below.

In the case of universal compression—the single packet being alone without having any memory—the expected code lengths is given in by:

$$H(X^n) = H_n(\theta) = \frac{d}{2}\log n + O(1). \quad (1)$$

In case of universal compression with clustered side information, the compression is trained with packets from the same source. The conditional entropy of $K^n$ is given by:

$$H(X^n \mid Y^{n,T}) = H_n(\theta) + \frac{d}{2}\log\left(1 + \frac{nK}{m}\right) + O\left(\frac{1}{n} + \frac{1}{\sqrt{T}}\right), \quad (2)$$

where $H_n(\theta)$ is the entropy of source model $\theta$. The compressor uses a memory of size m=nT (T packets of size n) to compress a new sequence of length n from x. This indicates the optimal compression rate for compression of packet with T/K training packets from the same one source model.

Hence, when T is sufficiently large, we expect that UcompPCM has the same performance as (2) indicates. This indeed demonstrates that clustering is optimal for the universal compression with side information. As such, the clustering of the side information (i.e., memory) is disclosed herein.

II. Memory-Assisted Data Compression System with Clustering

This section elaborates the detailed design of 3.5 layer data compression system, which implements the memory-assisted compression of real data transmission between data source and data destination. First, the system deployment and motivational scenarios and described followed by a discussion on the details of the system.

A. System Deployment

For traditional five-layer architecture of cellular core network, there are many switches and routers working as relay for multi-hop transmission. The memory-assisted data compression system with clustering disclosed herein may, in some examples, constitute a 3.5 layer module deployed between the network layer and transport layer. At the network layer, the compressor at the content generator server extracts IP payload as input and encapsulates compressed content to IP packet again before sending to next hop. In one example, the compression system disclosed herein may compress the IP packets with one or more lossless coding algorithms and decompress the packets at the last-hop switches or routers prior to the final destination node, improving transmission efficiency of down-link data. By saving volume of packets to be sent, large redundancy in networks can be reduced. Taking General Packet Radio Service (GPRS) cellular network as an example, the Serving GPRS Support Node (SGSN) pool works as data source, while the Base Station is taken as data destination. Another example is the backbone network of Google's network infrastructure, compression can also reduce redundancy in traffic from data center to Edge Point of Presence. Please note that data transmission in the backhaul comprises a large chunk of Google's overall costs.

B. System Architecture and Operations

With reference now to FIG. 2, a data source architecture 200 of the memory-assisted compression system with clustering in accordance with an exemplary embodiment of the disclosed technology is provided. As shown, the architecture 200 includes a mixture source model 214, a sample data packet 206 to be compressed, a plurality of data packets stored in memory 202, a training data packet cluster 204, a data compressor 212 (while a statistical data compressor is shown, in some embodiments, the compressor may comprise alternative forms of compressors, such as a dictionary-based compressor), indices representative of the data packets included as part of the training data packet cluster 210, and a compressed sample data packet 208 (which, in some embodiments, may include the indices 210, as discussed below).

The compression at data source is divided into two stages, which are referred to as the offline clustering stage and the online training selection stage. First, common memory packets (e.g., data packets stored in memory 202) are partitioned into different clusters for maximum compression performance. Second, for every new sample packet (e.g., sample data packet 206), memory packets sharing similar statistical properties are clustered together (e.g., training data packet cluster 204) as a side information for compression of the sample data packet 206 (referred as training selection). After compression with proper information, the compressor returns both the indices of clusters and the codeword for the compressed sequence as the new payload of IP packets (e.g., compressed sample data packet 208 and indices 210).

Figure 3:
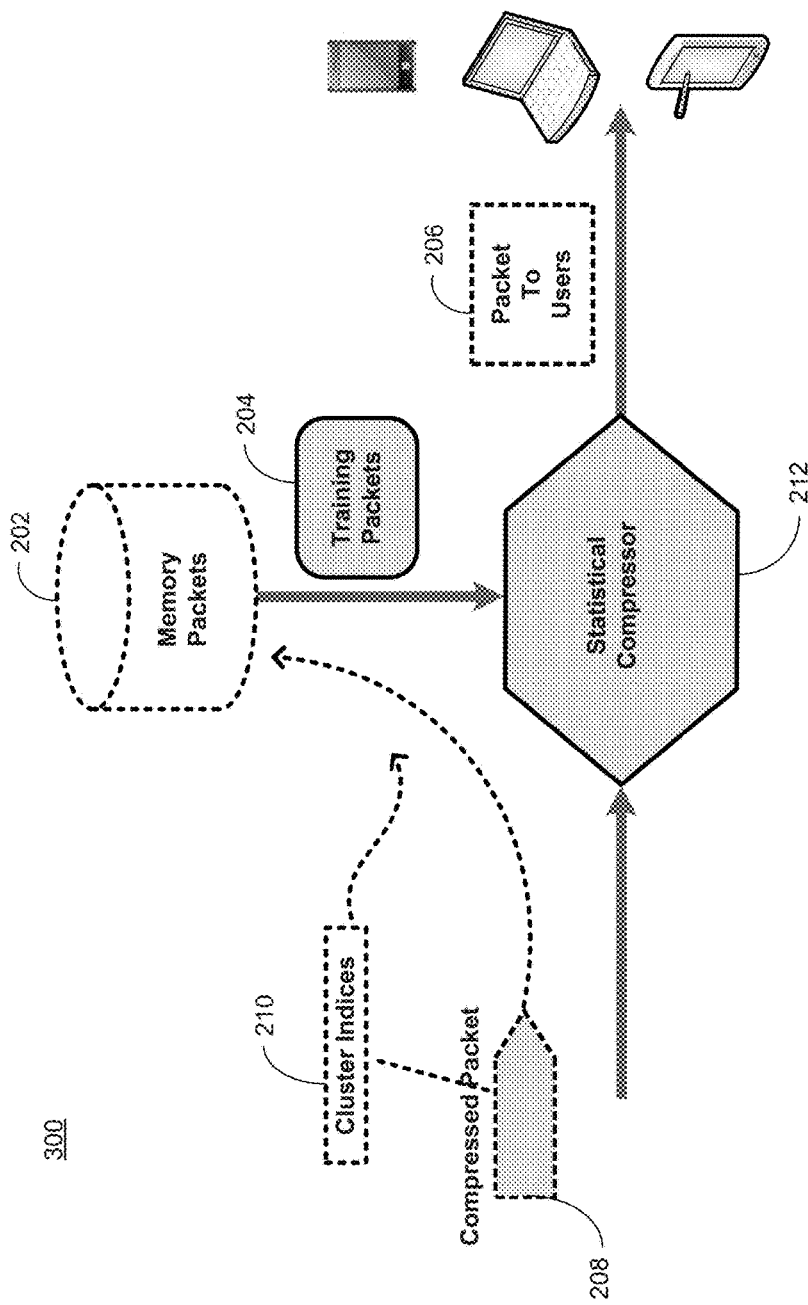
FIG. 3 illustrates a data decompression architecture for decompressing data compressed according to the memory-assisted compression system with clustering disclosed herein, in accordance with an exemplary embodiment of the disclosed technology.

With reference now to FIG. 3, a data decompression architecture 300 for decompressing data compressed according to the memory-assisted compression system with clustering disclosed herein is provided in accordance with an exemplary embodiment of the disclosed technology. Because of the reciprocal nature of data compression/decompression, the elements of architecture 300 are the same as the architecture 200, however, the functions of the architectures 200, 300 are different (i.e., architecture 200 performs compression while architecture 300 performs decompression). That is, the data destination accomplishes the procedures of compression in reverse order. With access to the common memory and the indices of associated clusters given by received compressed packet, the decompressor recovers the original content by indexing training clusters and distributes it to receivers according to an IP header.

C. Key Concerns for Implementation

The disclosed memory-assisted compression uses data clustering to accomplish selection of useful training data. Before delving into the details of the algorithms that may suitably be used for memory-assisted compression, the key problems to be solved to achieve the optimal compression performance in practice are first discussed.

1) Feature Space and Distance Metric:

Every data sequence (e.g., packet) generated from a mixture source model (e.g., mixture source model 214) has a length of roughly 1500 bytes. Thus, it is necessary to identify a generalized representation of each packet to build a feature space for all packets. The best feature vector needs to distinguish data with sufficient accuracy while it is still a reasonable representative of the original data. After projecting all data packets on a proposed vector space (i.e., after "vectorizing" the data), the distance between any two vectors will be the measurement of the similarity between them. Generally, it is desirable to have a metric that can best match the characteristics of compression algorithms as well.

2) Training Packet Selection Algorithm:

Theoretically, the optimal training set for compressor (e.g., data compressor 212) is the combination of packets generated from the same source model. In other words, it is desirable to select a cluster (e.g., training data packet cluster 204) that contains the packets from the same source model as the sample packet (e.g., sample data packet 206) to be compressed. This requires dividing the data packets stored in memory (e.g., data packets stored in memory 202) into groups (i.e., clusters) so as to be able to assign each new sample packet (e.g., sample data packet 206) to the optimal cluster for efficient compression.

3) Selection of the Compression Method:

Traditionally, dictionary-based compressors are applied to compress data in telecommunication systems for their high speed in online computation. Statistical compression has superior performance, but has a slower speed. The performance of both compressors with different schemes are compared below.

III. Feature Space and Distance Metric

Feature extraction deals with generating simple descriptions for a large amount of data that can accurately describe characteristics of original data. Good features of data packets will converge highly similar packets and distinguish packets from different sources.

In networks, characters are encoded via 8 bits or a multiple of 8 bits binary sequences (i.e., byte granularity). In other words, the minimum character encoding unit is one byte. To deal with a mixture source model (e.g., mixture source model 214), a 256-symbol set is selected as the minimum character unit for feature extraction. As a result, the empirical probability distribution (PDF) of the 256 symbols in data sequence is taken as the feature corresponding vector $\theta=(\theta_1, \ldots, \theta_{256})\in\Delta$. For memoryless source models, the frequency of the appearance of each character in the sequence is indeed the sufficient statistics of the whole sequence for inferring the unknown source parameter vectors (which are the probabilities of the symbols). Given that the network packets are roughly 1500 bytes and considering the curse of high dimensionality, a 255-dimensional vector space is selected for cluster analysis. It should be noted that, for a non-memoryless source model data sequences, the frequency of the appearance of the symbols can be taken as a necessary, but not sufficient, feature vector. However, as will turn out in the simulation results, this feature vector works very well for the memory-assisted compression of network packets in practice.

After projecting the training sequences of the memory onto the 255-dimensional vectors (i.e., after "vectorizing" the data packets stored in memory 202), every sequence can be represented using a point in a geometric space. To measure the similarity between the packets, two distance metrics are selected for performance comparison on the 255-dimensional feature vectors, namely Euclidean and Hellinger distance metrics. Euclidean distance is the widely used in signal processing of geometric spaces while Hellinger distance is used to quantify the similarity between two probability distributions. For any two discrete probability distributions P and Q, Hellinger distance is given by $$H(P, Q) = \frac{1}{\sqrt{2}} \sqrt{\sum_{i=1}^{255} \left(\sqrt{Pi} - \sqrt{Qi}\right)^2}, \quad (3)$$

where $P=[P_1, \ldots, P_{255}]$ and $Q=[Q_1, \ldots, Q_{255}]$ are the 255-dimensional vectors of data packets in our system. Please note that Hellinger distance is a generalized form of the relative entropy (which is not a distance metric) and naturally coincides with the redundancy in the universal compression, which is our performance metric of interest.

IV. Training Packet Selection Algorithm

In this section, three algorithms are presented for accomplishing packet-level clustering and selection of training packets to be fed to the compressor for memory-assisted compression. First two schemes are introduced utilizing k-Means clustering and k-Nearest Neighbor algorithms, respectively, in memory-assisted compression. Then, the discussion turns to a non-parametric clustering algorithm that overcomes the limitations of the previous algorithms and achieves a reasonably good compression performance as will be seen in the compression results examined below.

In real world networks, the number of sources in mixture model (e.g., mixture source model 214) is not generally known. Accordingly, this discussion relaxes the assumption that priori information is held about the clusters of the mixture source. To address this problem, an infinite mixture model is used to represent the data sequences as $$p(z \mid \Delta) = \lim_{m \to \infty} \sum_{i=1}^{m} \omega_i \delta(z - \theta^{(i)}), \quad (4)$$

where $w_i$ is the probability that the packet is generated by source model $\theta^{(i)}$ in the mixture, and m denotes the number of all possible data models from source set $\Delta$.

A. k-Means Clustering Algorithm

Suppose the total number of clusters is given by K. Then, the k-Means clustering algorithm partitions the memory into K clusters by trying to minimize the total distance of the packets inside the clusters from their respective cluster centers. Then, the cluster with shortest distance from the sample packet $X_n$ is assigned as the training data packet cluster (e.g., training data packet cluster 204) for compression.

There are two primary drawbacks to compression using k-Means clustering algorithm. First, the prior parameter of mixture source model needs to be known. Second, the performance and speed of the compressor both suffer from the large scale classified training set.

B. k-Nearest Neighbor Algorithm

In order to collect the packets that are most closely related for training, we assume that every packet could come from a different source model. Suppose we have memory $\{y^n(t)\}_{t=1}^T$ that consists of T packets from the mixture source model. Our clustering problem can be simplified as the aggregation of K training packets (called P) that have the minimum distance to the sample packet $X^n$ in the respective feature space. The closest training set is defined using the function $P=\{y^n(\tau_1), \ldots, y^n(\tau_K)\}$, where $$\{\tau_1, \ldots, \tau_K\} = \arg\min_{\{\tau_1,\ldots,\tau_K\}\subset\{1,\ldots,T\}} \sum_{i=1}^{K} \|X^n - y^n(\tau_i)\| \quad (5)$$

and $\tau_i \neq \tau_j$ if $i \neq j$. Note the number of training packets may be fixed as the minimum number of training packets for the compressor.

The above optimization formula effectively selects the k-Nearest packets from memory as training set (e.g., training data packet cluster 204). However, this method may not be systematically applicable, as the heavy overhead of encoding the indices of training sequences (for the decompressor to be able to decode) may offset the compression improvement.

C. Non-Parametric Clustering Algorithm

To strike a balance between performance and payload, a dynamic non-parametric clustering method is disclosed. First, memory is partitioned into m small sub-clusters $S=\{s_1, \ldots, s_m\}$. Each sub-cluster consists of about T/m neighboring packets with the minimum variance.

As soon as the fine-grain sub-clusters are produced, the construction of the training packet set (e.g., training data packet cluster 204) can begin. Each sub-cluster may be represented by the mean value of the included vectors, the similarity between sample packet $X^n$ and sub-clusters is measured by the distance between $X^n$ and $s_i$. After the initialization of the current sub-cluster set C=S, the sub-cluster from set c nearest to $X^n$ is merged into the training set Q and is removed from c after merging. In other words, the new dynamic training set Q is updated by $=\{s_{\pi_1}, \ldots s_{\pi_K}\}$, where $$\{\pi_1, \ldots, \pi_K\} = \arg\min_{\{\pi_1,\ldots,\pi_K\}\subset\{1,\ldots,T\}} \sum_{i=1}^{K} \|X^n - s_{\pi_i}\| \quad (6)$$

and $\pi_i \neq \pi_j$ if $i \neq j$. Also, $\|X^n - s_{\pi_i}\|$ represents the distance between $X^n$ and $s_{\pi_i}$. The merging ends when the expected number of training packets is reached. The actual number of sub-clusters may be fixed according to the minimum number of packets requirement of compressor, in some embodiments. The indices of sub-clusters needed for decompression is far less than that of k-Nearest clustering, so they can, in some instances, be ignored in performance comparison. Algorithm 1 below elaborates the procedures of the non-parametric clustering for selection of training packets.

---
Algorithm 1 Non-Parametric Clustering Algorithm
---

Compute empirical PDF vectors $\{d_i\}$
Compute sub-clusters $S = \{s_1, \ldots, s_m\}$
for Incoming packet $X^n$ do
    Compute distance $\|X^n - s_i\|$
    Current sub-cluster set C = S
    while ---
Algorithm 1 Non-Parametric Clustering Algorithm
--- training_pkt_num<min_training_num
    do
        if $s_{closest_i} = \min_{s_i \in c} \|X^n - s_i\|$ then
            Training set $Q = Q \cup \{s_{closest_i}\}$
            Index set $T = T \cup \{closest_i\}$
            training_pkt_num update
            Remove $s_{closest_i}$ from $C = \{s_1, \ldots, s_m\}$
        end if
    end while
    Return Q and T
end for

---

Figure 4:
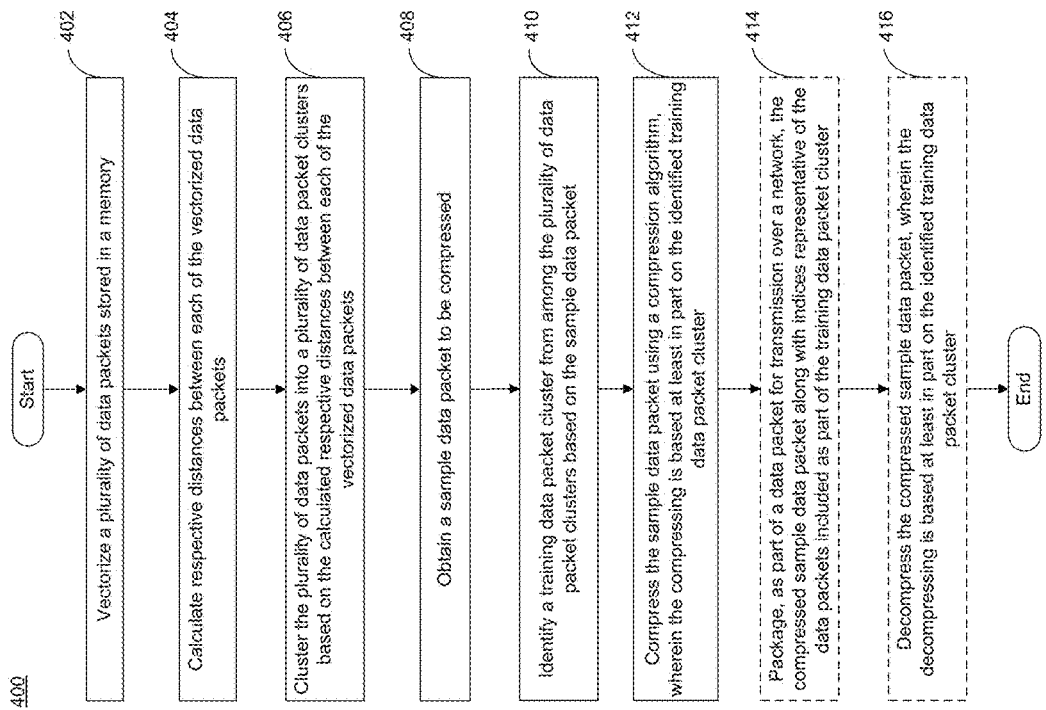
FIG. 4 is a flowchart illustrating a method for performing memory-assisted compression with clustering in accordance with an exemplary embodiment of the disclosed technology.

Before turning to the experimental results achieved by the disclosed technology, brief reference is made to FIG. 4. FIG. 4 is a flowchart illustrating a method 400 for performing memory-assisted compression with clustering in accordance with an exemplary embodiment of the disclosed technology. The method 400 begins at block 402 where a processor, such as CPU 102 of FIG. 1, vectorizes a plurality of data packets stored in a memory. At block 404, the processor calculates respective distances between each of the vectorized data packets. At block 406, the processor clusters the plurality of data packets into a plurality of data packet clusters based on the calculated respective distances between each of the vectorized data packets. At block 408, the processor obtains a sample data packet to be compressed. At block 410, the processor identifies a training data packet cluster from among the plurality of data packet clusters based on the sample data packet. Finally, at step 412, the processor compresses the sample data packet using a compression algorithm. The compression may be based, at least in part, on the identified training data packet cluster.

In some embodiments, the method 400 may include optional steps 414 and/or 416 as well. At optional block 414, the processor packages, as part of a data packet for transmission over a network, the compressed sample data packet along with indices representative of the data packets included as part of the training data packet cluster. At optional block 416, a processor (in all likelihood a different processor that the processor used to perform the compressing step, but, in certain instances, potentially the same processor as the processor used to perform the compressing step), decompresses the compressed sample data packet. The decompressing may be based, at least in part, on the identified training data packet cluster.

V. Simulation and Evaluation

In this section, simulation results are presented to demonstrate the performance of the proposed memory-assisted compression system with clustering. Through comparison of the compression result with different distance metrics, clustering methods and compressors, the tradeoff between compression speed and performance are discussed.

A. Simulation on Real Network Traces

For a realistic evaluation, simulation was performed with data gathered from 20 different mobile users' network traces in the real world. First, packet sequences were randomly generated from a 27000-packet mixture of 15 users to construct the commonly accessible memory for clustering. Then, 10 sample packets from each of the 20 users (200 packets in total) were selected as test packets. Note that the test packets are distinct from the packets used for training. Besides, there were 50 test packets that were generated from the 5 users, which were not used for the generation of the training packets and hence did not have packets in the mixture memory. An average compression rate of each test packet was taken as the compression performance metric. Note that each test packet was compressed separately. This was due to the fact that packets flow in networks is a combination of packets from different sources, and cannot be simply compressed together.

B. Comparison of Different Clustering Schemes

To compare the overall performance of memory-assisted compression, there may be many possible compression schemes according to the three concerns discussed above. The setup and performance of compression with different clustering schemes are given in Table I below.

TABLE I

Average Compression Rate with Different Clustering Schemes

| Ratios (bits/byte) | k-Nearest | k-Means | Non-parametric |
|---|---|---|---|
| Hellinger | 2.41 | 2.63 | 2.42 |
| Euclidean | 2.52 | 2.65 | 2.49 |

1) Impact of the Distance Metric:

As described above, two different metrics were used to define the similarity of data packets, which are Hellinger distance and Euclidean distance. Table I demonstrates the average compression performance using each of the two distance metrics and the three packet selection algorithms. As can be seen, Hellinger distance metric performs generally five percent better than Euclidean distance metric. This indicates that for the purpose of statistical compression, Euclidean distance does not match the statistical feature vectors. This is not surprising as Hellinger naturally considers the redundancy. This disclosure recognizes that a distance metric that is even more efficient than the Hellinger distance may exist, and a person having ordinary skill in the art would be aware of such a distance metric and how to incorporate it into the compression system disclosed herein.

2) Impact of the Packet Selection Algorithm:

Three packet selection algorithms were tested, namely, k-Nearest-Neighbor clustering algorithm, k-Means clustering algorithm, and non-parametric clustering algorithm. According to Table I, k-Nearest clustering and non-parametric clustering achieve very similar performance, around 8% better than k-Means clustering. Considering the overhead for handling the indices needed for decompression in the k-Nearest clustering, non-parametric clustering will even outperform the k-Nearest clustering. Besides, non-parametric clustering does not require to know the number of clusters in advance like k-Means clustering. Furthermore, non-parametric method processes memory partition offline, which indicates less latency than k-Nearest clustering. By using ball tree data structure, the computational cost of nearest sub-clusters search is $O(N \log(N))$, where $N$ is the number of sub-clusters.

C. Memory-Assisted Compression Performance Evaluation

Figure 5:
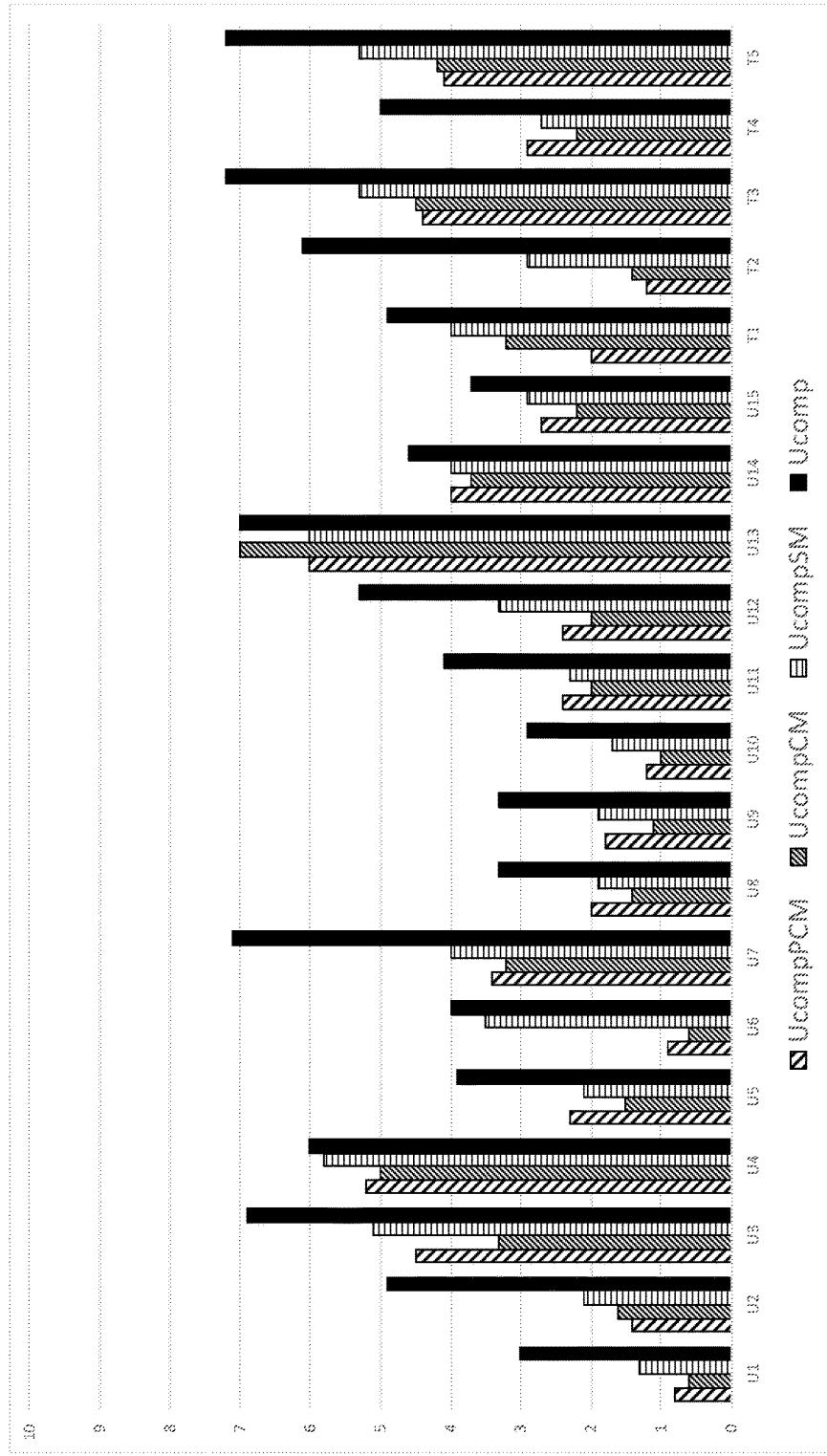
FIG. 5 is a bar graph illustrating the average compression-rate of Lite PAQ on real traffic data achieved according to one exemplary embodiment of the disclosed technology.
Figure 6:
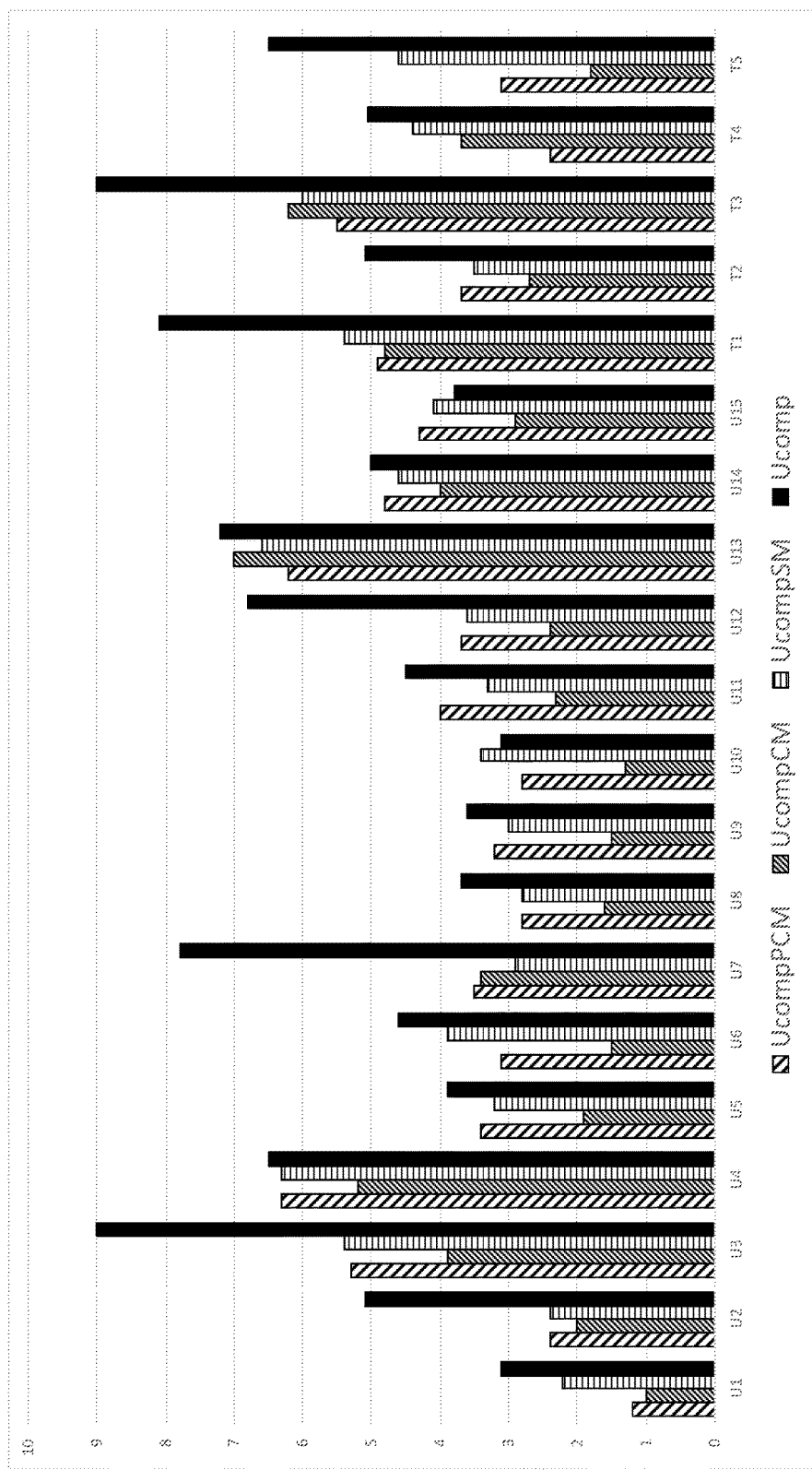
FIG. 6 is a bar graph illustrating the average compression-rate of CTW on real traffic data achieved according to one exemplary embodiment of the disclosed technology.

In order to demonstrate the impact of the side information on the compression performance, the average codeword length of the four important schemes (UcompPCM, UcompCM, UcompSM, and Ucomp) were analyzed (see above for discussion on each of the four schemes). FIGS. 5-6 illustrate the average compression-rate on these data with Lite PAQ compressor (FIG. 5) and CTW compressor (FIG. 6), respectively.

As can be seen, universal compression without the help of any memory packets (Ucomp) results in the longest average code lengths, which verifies the penalty of finite-length compression. UcompCM, which is the cluster-based memory-assisted compression, consistently outperforms all other schemes. It is worth noting that for the data from users which are not necessarily from mixture source model (user T1, . . . , T5), non-parametric clustering still achieves impressive improvement compared to simple memory assisted compression UcompSM. Compression with memory of user's previous packets, UcompPCM, sometimes performs well, while it sometimes performs poorly due to the fact that the user data possibly comes from variant source models. In general, the clustering algorithms disclosed herein may be applicable to both Lite PAQ compression and CTW compression with impressive improvement.

Table II presents the average traffic reduction over all of the 15 users with different compression algorithms. Using the best clustering scheme from the above two comparison, the overall improvement of both dictionary-based compressor (Gzip) and statistical compressor (Lite PAQ and CTW) were compared. As can be seen, Lite PAQ achieves nearly 70% traffic reduction and CTW achieves 65% reduction. With more than 65% traffic reduction, statistical compression outperforms dictionary-based compression, which offers 60% reduction. However, dictionary-based compression tends to have ten times higher compression speed, and therefore, may be desirable in certain applications. Wireless applications tolerates more latency than wired services and statistical compression is more suitable for wireless data compression, and dictionary-based compression is more likely to be utilized in wired network compression.

TABLE II

The Average Traffic Reduction (%) of Different Compression Schemes on the Real Network Traffic Traces

| Avg. Traf. Red. | UcompPCM | UcompCM | UcompSM | Ucomp |
|---|---|---|---|---|
| Lite PAQ | 65.47% | 69.62% | 59.37% | 41.77% |
| CTW | 52.36% | 65.32% | 51.83% | 36.29% |
| Gzip | 44.80% | 60.79% | 38.12% | 24.87% |

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   vectorizing, by a processor, training data packets from compound information sources, the training data packets stored in a memory to provide vectorized training data packets;
   clustering, by the processor, the training data packets into training data packet clusters based on a clustering algorithm, each training data packet cluster having a training data cluster classification defined by training data cluster parameters;
   obtaining, by the processor, a sample data packet from one of the compound information sources, the sample data packet not being one of the training data packets;
   determining, by the processor, a compressibility threshold of the sample data packet, wherein if the threshold is not met the sample data packet is not compressible and not stored in memory, and wherein if the threshold is met the sample data packet is compressible and stored in memory;
   extracting, by the processor, source statistics from the compressible sample data packet, wherein the source statistics are based at least in part on the compound information source of the compressible sample data packet;
   storing, in the memory, memorized context of the source statics;
   identifying, by the processor, one of the training data packet cluster from among the training data packet clusters based on the memorized context of the source statics of the compressible sample data packet, and updating the training data cluster parameters of the identified training data packet cluster upon addition of the compressible sample data packet to the identified training data packet cluster; and compressing, by the processor and based at least in part on the identified training data packet cluster, the sample data packet using a compression algorithm to provide a compressed sample data packet, the compressed sample data packet having a compressed packet body.

2. The computer-implemented method of claim 1 further comprising packaging, as part of a data packet for transmission over a network, the compressed sample data packet along with indices representative of the training data packets included as part of the identified training data packet cluster.

3. The computer-implemented method of claim 1, wherein identifying one of the training data packet clusters from among the training data packet clusters comprises:
   vectorizing the compressible sample data packet to provide a vectorized compressible sample data packet;
   vectorizing the training data packet clusters to provide vectorized training data packet clusters; and
   calculating respective distances between the vectorized compressible sample data packet and each of the vectorized training data packet clusters.

4. The computer-implemented method of claim 3, wherein calculating the respective distances between the vectorized compressible sample data packet and each of the vectorized training data packet clusters comprises calculating the respective differences using a non-parametric clustering algorithm.

5. The computer-implemented method of claim 1, wherein the compression algorithm is selected from the group consisting of a Lite PAQ compression algorithm and a context tree weighting (CTW) compression algorithm.

6. The computer-implemented method of claim 1 further comprising decompressing the compressed sample data packet;
   wherein the decompressing is based at least in part on the identified training data packet cluster.

7. A computing system configured to perform the method of claim 1, comprising:
   the processor of claim 1; and
   the memory of claim 1 operatively connected to the processor;
   wherein the memory comprises executable instructions that when executed by the processor cause the processor to effectuate the method of claim 1.

8. The computer-implemented method of claim 1 further comprising clustering, by the processor, the training data packets into the training data packet clusters corresponding to the respective compound information sources of the training data packets.

9. The computer-implemented method of claim 1, wherein vectorizing the training data packets comprises vectorizing the compressible sample data packet comprising a compressible sample data packet compound information source indicator; and
   wherein identifying one of the training data packet clusters from among the training data packet clusters is based at least in part on the compressible sample data packet compound information source indicator.

10. The computer-implemented method of claim 1, wherein vectorizing the training data packets comprises vectorizing the of training data packets into a 255-dimensional vector space.

11. The computer-implemented method of claim 1, wherein the clustering algorithm calculates respective distances between each of the vectorized training data packets.

12. The computer-implemented method of claim 10, wherein the vector space corresponds to a frequency of an appearance of symbols in a training data packet from a 256-symbol set.

13. The computer-implemented method of claim 1, wherein the clustering algorithm is based on the empirical entropy of the vectorized training data packets.

14. The computer-implemented method of claim 11, wherein calculating the respective distances between each of the vectorized training data packets comprises at least one of:
   calculating the respective distances between each of the vectorized training data packets using a Hellinger distance calculation; and
   calculating the respective distances between each of the vectorized training data packets using a Euclidean distance calculation.

15. The computer-implemented method of claim 1, wherein the compressibility threshold is based on the empirical entropy of the sample data packet.

16. A computer-implemented method comprising:
   establishing initial data packet clusters comprising:
      storing in a memory initial data packets, each originating from a compound information source of at least two compound information sources; and
      clustering, by a processor, the initial data packets into the initial data packet clusters based on a clustering algorithm, each initial data packet cluster having an initial data cluster classification defined by initial data cluster parameters;
   compressing a sample data packet comprising:
      obtaining, by the processor, a sample data packet from one of the compound information sources, the sample data packet not being one of the initial data packets;
      determining, by the processor, a compressibility threshold of the sample data packet, wherein if the threshold is not met the sample data packet is not compressible and not stored in memory, and wherein if the threshold is met the sample data packet is compressible and stored in memory;
      extracting, by the processor, source statistics from the compressible sample data packet, wherein the source statistics are based at least in part on the compound information source of the compressible sample data packet;
      storing, in the memory, memorized context of the source statics;
      identifying, by the processor, one of the data packet clusters from among the data packet clusters based on the memorized context of the source statics of the compressible sample data packet; and
      compressing, by the processor and based at least in part on the identified data packet cluster, the sample data packet using a compression algorithm to provide a compressed sample data packet; and
   modifying the data cluster parameters of the identified data packet cluster upon addition of the compressible sample data packet to the identified data packet cluster, creating a modified data packet cluster.

17. The computer-implemented method of claim 16, wherein establishing initial data packet clusters occurs once;
   wherein compressing a second and subsequent sample data packet and modifying the data cluster parameters of the identified data packet cluster occurs repeatedly;
   wherein identifying, by the processor, one of the data packet clusters from among the data packet clusters comprises identifying, by the processor, one of the data packet clusters from among the modified data packet clusters and any remaining initial data packet clusters;

wherein compressing, by the processor and based at least in part on the identified data packet cluster comprises compressing, by the processor and based at least in part on the identified initial or modified data packet cluster; and wherein modifying the data cluster parameters of the identified data packet cluster comprises modifying the data cluster parameters of the identified initial or modified data packet cluster.

18. The computer-implemented method of claim 17, wherein compressing the second and subsequent sample data packets and modifying the data cluster parameters of the identified data packet clusters occurs repeatedly at least until each of the initial data clusters comprise a modified data packet cluster.

19. The computer-implemented method of claim 16, wherein establishing initial data packet clusters occurs once;

wherein compressing a second and subsequent sample data packet and modifying the data cluster parameters of the identified data packet cluster occurs repeatedly; and wherein a modified data packet cluster can be modified more than one time.

* * * * *